Figure 1:
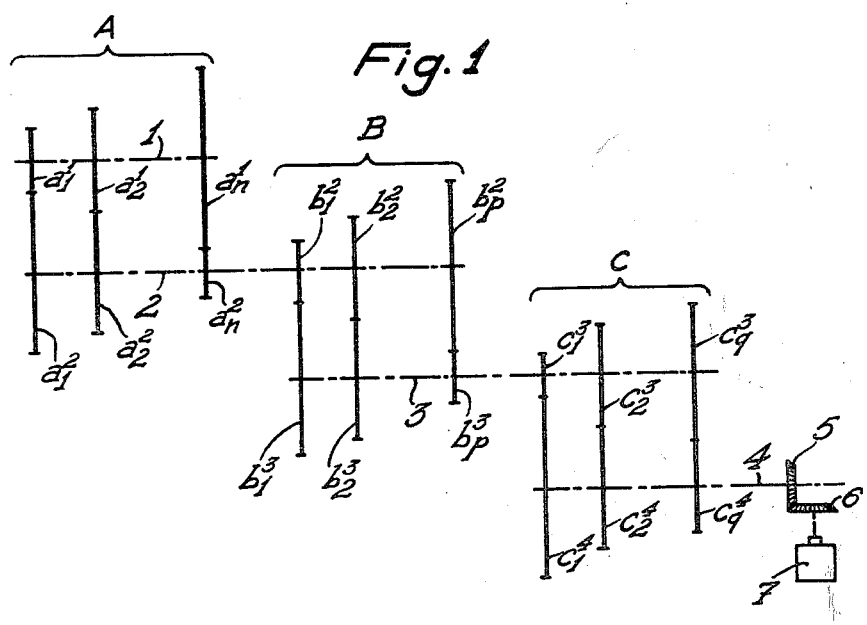

Jan. 19, 1965

P. M. J. GRAU 3,165,940

AUTOMATIC GEARBOX CONTROL DEVICE

Filed June 4, 1962

United States Patent Office 3,165,940
Patented Jan. 19, 1965

3,165,940
AUTOMATIC GEARBOX CONTROL DEVICE
Philippe Marie Joseph Grau, Tourcoing, Nord, France, assignor to Compagnie de Chemins de Fer Departementaux, Paris, Seine, France
Filed June 4, 1962, Ser. No. 199,917
Claims priority, application France, June 5, 1961, 863,901
16 Claims. (Cl. 74—365)

A gearbox constitutes a transmission component in which gear trains or other coupling means, each having a constant or substantially constant multiplication ratio, can be alternately brought into engagement to provide discontinuous changes of multiplication between an input shaft and an output shaft. Such gearboxes are generally used between a member which is to be driven at varying speed and a driving member which will operate satisfactorily only over a relatively limited range of rotational speeds. Examples in point are the driving of rail or road vehicles by means of a heat engine in particular.

Recourse has already been had to novel designs enabling gear changes to be made by means of relay mechanisms actuated by such diversified variables as the engine rotational speed, the engine power developed, the opposing torque in the driven shaft, and the like.

The present invention comprises a device of the type hereinbefore discussed, wherein, by means of a set of grouped relays, an analogous image is constituted of the various meshings taking place in the gearbox, said relays being energized by a tachometer device associated to the output shaft of said gearbox, each of said relays being sensitive to the continuously fluctuating output variable from said tachometer device, and each relay being tripped for a given value of said variable, the whole system being such that the various relay tripping values be stepped to correspond with the various multiplication ratios provided by the gearbox.

In the case of a gearbox incorporating successive stages, the group of relays which constitutes the analogous image of the gearbox is divided into as many sets as there are stages and, in the case of a gearbox of this type, the set of relays associated to the output stage is provided with feedback means onto the sets of relays located at the input end, and each intermediate set is provided with feedback means onto the sets which follow it towards the input.

In a preferred embodiment, in view of the discontinuity in the changes of ratio, each set of relays comprises a number of relays equal to one less than the number of ratios in the corresponding stage, so that it is possible to arrange an automatic control system with a small number of relays, yet to obtain a large number of gear combinations, each stage in the gearbox being provided with automatic return means onto the lowest ratio, say, when none of the corresponding relays has tripped.

In the case where electrical control is used, the tachometer device will consist of a generator delivering a voltage which varies continuously with the gearbox output speed and each relay will then be a voltage relay which trips for a predetermined value of said voltage.

Each relay has a terminal connected to one of the generator terminals.

The relays associated to the stage nearest the output end of the gearbox have their second terminals connected to the other generator terminal.

The armature of each relay in this first set is adapted to introduce into the energizing circuits of the relays in the other sets stepped resistors and also compensating resistors the function of which is to maintain the equivalent overall resistance of the circuits supplied by said generator at a constant value.

Similarly, the relays of the intermediate sets are provided with armatures which introduce stepped resistors into the circuits of the subsequent sets, together with compensating sets performing the same function as those of the first set.

The stepped resistors referred to are arranged in series, while the compensating resistors are in parallel.

Each relay armature additionally comprises control means which operate directly or preselectively to cause the engagement of a pair of pinions or like components.

This first set of relays, which is controlled by the rotational speed of the output shaft, selects the gear ratios that must be engaged in order to maintain the speed of the input shaft between two limit values compatible with good engine performance. Thus the control system may be entirely automatic.

This first set of components, however, is not required to have a degree of accuracy sufficient to produce relay triggering (i.e. a change of gear ratio) at specific engine speeds which is necessary when the engine sustains power loadings; on the other hand, this accuracy will be adequate when the engine is not furnishing power, as may be the case when the engine speed is not necessarily linked to the gearbox output speed, an example being shown when the gearbox includes a freewheel system or operates in the declutched position.

With a view to improving the accuracy of the relays as a whole, recourse is had to a second set of elements which influence relay tripping and take the demand on the engine into account, or which provoke such relay tripping in which case the function of preselection is left to the first set.

Where electrical relays are utilized, this second set may consist of resistors incorporated at the tachometer generator output. Such an arrangement could inuclude a resistor shunted by a switch the contact clapper of which is connected to a tachometer device for measuring the engine's rate of revolution and a potentiometer the slider of which is connected to such engine power controlling devices as a carburetter butterfly valve, the regulating element in a fuel injection pump, or the like, in the case of a heat engine.

In this way, the insertion or exclusion of the resistor in the relay energizing circuit steps up or steps down the voltage of the supply current, thereby biasing gear ratio changes in one sense or the other, as likewise occurs through the position of the potentiometer.

Such a relay type control system remains economical even for a very large number of gear ratios since the number of ratios provided by a staged gearbox is equal to the product of the number of combinations in the several stages and since such a gearbox can be controlled using a number of relays equal to the sum of the number of combinations provided by the several stages, less the number of stages.

The description which follows with reference to the accompanying drawing, which is filed by way of example and not of limitation, will give a clear understanding of how the invention may be carried into practice.

Figure 2:
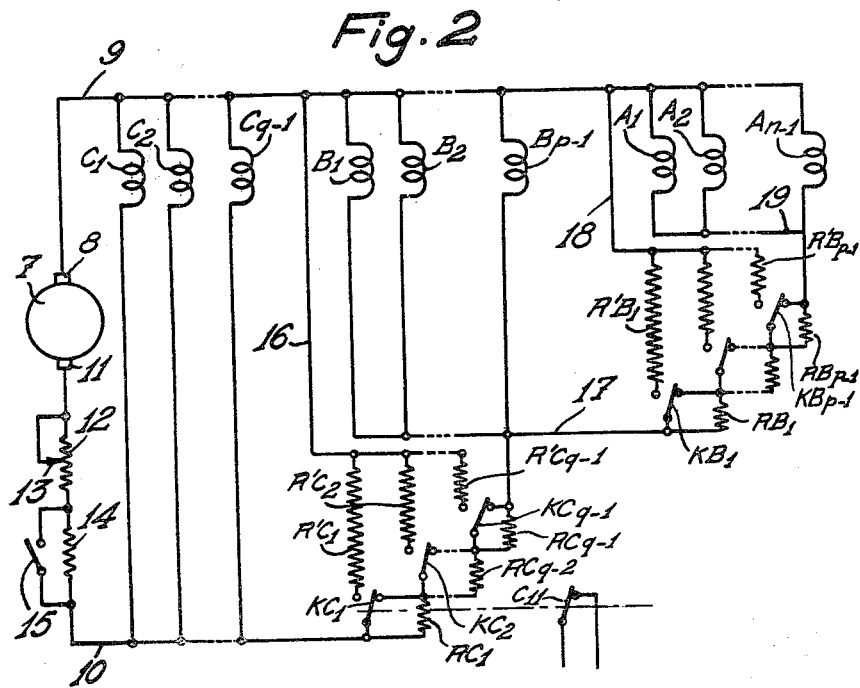

Referring to the drawing filed herewith:

FIG. 1 is a highly diagrammatic illustration of the disposition used for a staged gearbox executed according to the invention; and FIG. 2 represents the electrical wiring diagram for the control relays.

The gearbox illustrated in highly schematic fashion comprises three stages A, B and C. The first stage is provided with $n$ pairs of toothed wheels such as the gearwheels $a_1^1, a_1^2 \ldots a_n^1$, where $n$ is any number. The shaft 1 on which the gearwheels $a_1^1$ to $a_n^1$ are mounted is the gearbox input shaft. The shaft 2 on which the gearwheels $a_1^2$ to $a_n^2$ are mounted is a first layshaft which serves as input shaft to stage B.

Stage B comprises $p$ pairs of gearwheels, where $p$ is another number. Gearwheels $b_1^2$ to $b_p^2$ are mounted on shaft 2 while gearwheels $b_1^3$ to $b_p^3$ are mounted on a layshaft 3 which serves as input shaft to stage C.

In stage C, which comprises $q$ pairs of gearwheels, where $q$ is any number, gearwheels $c_1^3$ to $c_q^3$ are mounted on shaft 3, while the corresponding gearwheels $c_1^4$ to $c_q^4$ are mounted on a shaft 4 which is the gearbox output shaft.

A positive drive, consisting say of a bevel pinion 5 on the shaft 4 and a bevel gear 6 on the shaft of a tachometer generator 7, connects the latter to shaft 4.

Said generator 7, which furnishes a voltage proportional to the rotational speed, has one of its output terminals 8 connected to the relay inputs, all of which relays have one of their poles connected to said terminal. This group of relays comprises three sets, each corresponding to one of the gearbox stages, and the number of relays in each set is one less than the number of pairs of gearwheels in the corresponding stage. Thus the coils $A_1$, $A_2 \ldots A_{n-1}$ correspond to the pairs of gearwheels in the first stage A, the wheels designated being those which are rigid with the shaft 1, namely $a_1^1, a_2^1 \ldots a_n^1$. This correspondence is also established for the coils $B_1$, $B_2$, $B_{p-1}$ which correspond to the pairs of gearwheels in stage B; in the same way that the coils $C_1$, $C_2$, $C_{q-1}$ correspond to the pairs of gearwheels in stage C.

Each of these relays operates an actuating clapper to provoke the meshing of a corresponding pair of gearwheels in one of the gearbox stages. (In the interests of simplification in the drawings, only one of these clappers is shown, the corresponding arrangement being indifferently of the triggering or preselective variety and not being illustrated). The clapper shown is clapper $C_{11}$, through which pinion $c_2^3$ is rigidly united with shaft 3 and $c_2^4$ with shaft 4.

It should be noted that the number of relays referred to is one less, in each set, than the number of pairs of gearwheels in each correponding stage in view of the fact that, when the system is inoperative, such a mechanical gearbox is provided with means which automatically restore the meshings to the lowest ratio in each stage, namely which cause pairs $a_1^1$-$a_1^2$, $b_1^2$-$b_1^3$ and $c_1^3$-$c_1^4$ to become operative.

The set of relays $C_1$ to $C_{q-1}$ is thus connected on the one hand to the conductor 9 which is connected to terminal 8 of generator 7 and on the other hand to a conductor 10. Said conductor 10 is connected to terminal 11 of generator 7 (which terminal is opposed to terminal 8) through a potentiometer 12 one part of the resistive element of which can be short-circuited by means of a slider 13, said potentiometer being connected in series to a resistor 14 adapted to be shunted by a switch 15.

The set of relay coils $C_1$ to $C_{q-1}$ can be shunted by a battery of individually corresponding resistors $R'C_1$ to $R'C_{q-1}$ connected in parallel to a conductor 16 which is in turn connected to conductor 9. Each of resistors $R'C_1$ to $R'C_{q-1}$ corresponds to an operative contact adapted to be touched by a corresponding clapper of a set of clappers $KC_1$ to $KC_{q-1}$. These clappers are respectively actuated by the corresponding coils $C_1$ to $C_{q-1}$. The first clapper $KC_1$ is connected directly to conductor 10 and is provided with a resting contact connected to the next clapper $KC_2$. A resistor $RC_1$ is connected in parallel across the two clappers $KC_1$ and $KC_2$. Lastly, clapper $KC_{q-1}$ is connected through a resistor $RC_{q-2}$ to the preceding clapper and also to the resting contact thereof. A resistor $RC_{q-1}$ is connected in parallel across clapper $KC_{q-1}$ and the resting contact thereof.

The resting contact of clapper $KC_{q-1}$ is connected to a conductor 17 and the coils of set $B_1$ to $B_{p-1}$ are connected in parallel across conductor 9 and said conductor 17. To each of coils $B_1$ to $B_{p-1}$ similarly corresponds one of the clappers $KB_1$ to $KB_{p-1}$ and also one of the resistors $R'B_1$ to $R'B_{p-1}$ connected in parallel to a conductor 18 which is itself connected to conductor 9, each of said resistors being connected to the corresponding operative contacts of clappers $KB_1$ to $KB_{p-1}$.

Similarly, resistors $RB_1$ to $RB_{p-1}$ are respectively connected in parallel across the clappers and their respective resting contacts, each of said resting contacts being connected to the next clapper, in the same way as in the set described precedingly.

The last resting contact (corresponding to clapper $KB_{p-1}$) is connected to a conductor 19, and the coils of the third set $A_1$ to $A_{n-1}$ are connected in parallel across said conductor 19 and conductor 9.

The individual coils of the three sets of relays are designed in such manner that said relays function as voltage relays and trip for successive steps voltages furnished by tachometer generator 7. Thus each relay trips for a given rotational speed of output shaft 4.

It is clear that the gear change control means hereinbefore described are divided into two groups having distinct functions.

The first group, comprising tachometer generator 7, controls the speed of the output shaft and permits selection of the gear ratio combinations requiring to be engaged to maintain the speed of input shaft 1 between two limit values $N_1$ and $N_2$ compatible with good performance from the driving engine, which engine may be a heat engine for instance.

There is no call to require of this first group a degree of accuracy sufficient to trigger changes of gear ratio combinations at specific engine speeds, as would be necessary when the engine is under load; on the other hand, its accuracy could be adequate to ensure such changes when the engine is running under no-load conditions, particularly when the engine speed need not compulsorily be linked to the output shaft r.p.m. as for example when the output shaft incorporates a freewheel system or when such freewheel systems are provided in the gearbox itself, or else when at least one clutch is inserted into the transmission system.

A second group of elements, comprising potentiometer 12 and its slider 13, together with resistor 14 and its switch 15, makes it possible to so influence the first group as to take the engine speed and hence the rotational speed of the input shaft 1 strictly into account, to ensure that the engine is always run within the r.p.m. range bounded by $N_1$ and $N_2$, while nevertheless accommodating variations in the limits of this range, according to the power demand.

In the stationary configuration, the gears are engaged in the lowest multiplication ratio or the highest demultiplication ratio.

After the shaft 4 has been set in rotation it gradually gathers speed and the voltage furnished by the generator 7 increases accordingly. When this voltage reaches a certain value, relay $A_1$ operates. In so doing it opens a contact (not shown but analogous to contact $C_{11}$) which produces a change of gear ratio in that stage, by disengaging the pair of pinions $a_1^1$-$a_1^2$ to engage pinions $a_2^1$-$a_2^2$.

The operating voltage of relay $A_1$ is so chosen that the speed attained by shaft 4 when said relay $A_1$ operates (having regard for the gear ratios engaged in the other two gearbox stages) correspond to an input shaft r.p.m. included between the two limits $N_1$ and $N_2$ and having a value close, say, to $N_2$, the upper permissible engine r.p.m. figure.

Thus each relay is adjusted so as to operate for a voltage corresponding to the highest admissible speed of output shaft 4 in the gear combination of corresponding position in that particular stage. As the output shaft r.p.m. increases from zero onwards, relay $A_1$ operates when said output shaft r.p.m. reaches a maximum on the corresponding gearbox ratio. Relays $A_1$ to $A_{n-1}$ operate in succession as the output shaft r.p.m. increases.

Relay $B_1$ then operates and introduces the resistor $RB_1$, which resistor causes all the relays $A_1$ to $A_{n-1}$ to trip out and to thereby restore engagement of pinions $a_1^1$ and $a_1^2$ in conjunction with the switch to engagement of pinions $b_2^2$ and $b_2^3$ in stage B.

As the speed of shaft 4 continues to increase, relays $A_1$ to $A_{n-1}$ are energized in turn once more until relay $B_2$ trips in and causes engagement of $b_3^2$ and $b_3^3$, and so on for stage B. The process is repeated in identical fashion for the relays of the subsequent stages, in conjunction with a full sweep through the relays of the preceding stages.

Thus it may be seen that when a relay $C_x$ operates, the corresponding clapper $KC_x$, by a suitable choice of the values of resistors $RC_1$ to $RC_x$, divides the voltage supplied to the coils of groups A and B in the ratio of the voltages required to operate relays $C_{x+1}$ and $C_x$, viz., $$\frac{UC_{x+1}}{UC_x}$$

and that introduction of the resistor $R'C_x$ maintains the equivalent circuit resistance constant by offsetting the series-connected resistors $C_1$ to $C_x$, the resistors $R'C_1$ to $R'C_x$ being in parallel and the relays $C_1$ to $C_{x-1}$ in relay group C being already in the energized state.

Similarly, each relay in group B is adjusted to operate for a voltage corresponding to the highest permissible speed of shaft 4, to which speed also corresponds a speed of shaft 1 close to the limit $N_2$, having regard for the particular ratio engaged in stage C and for the combination previously engaged in stage B. As soon as engagement takes place, each associated clapper KB introduces a corresponding resistor RB which provides the voltage in the circuit supplying the relays in group A and introduces a resistor $R'B$ which maintains the equivalent overall circuit resistance constant.

Thus when a relay $B_y$ operates, the clapper in the corresponding position introduces a resistor $RB_y$ into the circuit supplying the relays in group A and divides the voltage therein in the ratio $$\frac{UB_{y+1}}{UB_y}$$

Similarly, each relay in group A is adjusted to operate for a voltage corresponding to the highest permissible r.p.m. of output shaft 4, having regard for the ratios engaged in stages B and C and for the gear combination previously engaged in stage A.

Thus, through the medium of their clappers K, the various relays select a gear combination in the subsequent position in the corresponding stage. For example, if relay $A_1$ is energized and relays $A_2$ to $A_{n-1}$ are not; if relays $B_1$ and $B_2$ are energized and relays $B_3$ to $B_{p-1}$ are not; and if relays $C_1$ to $C_x$ are energized and relays $C_{x+1}$ to $C_{q-1}$ are not, then the corresponding gear combinations obtained will involve the following pairs of pinions:

$$a^1{}_2, a^2{}_2, b^2{}_3, b^3{}_3, c^3{}_{x+1} \text{ and } c^4{}_{x+1}$$

The relays in the groups corresponding to stages C, B and A reconstitute the gearbox in analogous fashion starting from its output. The system thus represents a true image of the mechanical gearbox.

In this image each stage in the gearbox is represented by a number of relays equal to one less than the number of gear combinations in that stage, for even when the relays are not all energized, the corresponding stage is automatically engaged in the lowest gear combination and, for a given number of ratios, there is an identical number, less one, of intervals to be crossed.

For this reason, with a three-stage gearbox having $n$ times $p$ times $q$ ratios, control is obtained with $$(n-1)+(p-1)+(q-1)$$

relays.

Thus with an eight-speed gearbox having three stages providing two ratios each, operation is possible with only three relays, while a six-speed gearbox having two stages of which one provides two ratios and the other three can likewise be operated with only three relays.

As can be seen from FIG. 2, tachometer generator 7 does not supply the aforementioned relays directly, a second group of elements (potentiometer 12 and resistor 14) being inserted into the circuit.

The clapper of switch 15 may be connected, say, to a centrifugal regulator or like revolution-counting device which detects the rotational speed of the engine driving the shaft 1. The system can be designed, for example, so that said clapper be in its operative position when the engine r.p.m. has a value equal to N which may be the mean value between the lower limit $N_1$ and the upper limit $N_2$ of the engine's rated r.p.m. range.

For all engine speeds in excess of this mean value N, the clapper 15 will be operative and will exclude the resistor 14 from the supply circuits. In this way the voltage relays in all the stages will be boosted slightly and this will in turn assist selection of the upper ratios, i.e. the less demultiplied ratios.

Conversely, for engine speeds less than said mean value, clapper 15 will be open and resistor 14 will remain in circuit, thereby stepping down the supply voltage to the relays and consequently assisting selection of the lower ratios.

In addition, the slider 13 may be connected for instance to the system controlling the fuel intake into the heat engine utilized, and this connection may be a direct or indirect one. In the case of an engine employing carburation, the connection may be made by means of desmodromic controls between the slider 13 and the carburetter butterfly valve. Where an engine with fuel injection and a regulator therefor are used, the control may connect the slider to the rack regulating the injection pump pistons, said rack metering the quantity of fuel delivered at each cycle of the injection pistons.

For heavy fuel intakes, the slider 13 is shifted in the direction wherein it short-circuits a major portion of the resistor 12, thereby stepping up the relay voltage and consequently assisting gear changes to higher ratios, as explained precedingly. For small fuel intakes, a major portion of resistor 12 remains in circuit, thus stepping down the relay voltage and assisting selection of the lower ratios. Manifestly, the reverse arrangement may be envisaged.

In consequence, this second group of elements provides a finer resolution of the indications given by the first group. For indeed its action modifies the data arriving from the first group of elements and results in the precise circumstances and time at which the gear ratios must be changed being decided or more finely specified. The action of this second group of elements also permits modification of the limit values $N_2$ and $N_1$ at which the changes of combinations take place in terms of the power furnished by the engine, operation of the latter under optimum conditions being thereby ensured.

Where a fuel injection engine equipped with a regulator is used, the slider 13 may be so connected to said regulator that its position provide a measurement of the excess power available at any given variable engine speed. A means is thus provided of assessing stability in the upper gear ratios.

Letting P be the maximum available power at an engine speed $N_2$, for instance, and R the ratio of the gear combination actually engaged to the gear combination immediately above (R may be constant if the gearbox comprises equally stepped gear ratios), then operation will be stable on the upper combination provided that fuel cut-off on the lower combination has for value:

$$P-\frac{P}{R}=P\cdot\frac{R-1}{R}$$

This makes it possible to avoid the untimely triggering of a gear change in the event that stable operation on the upper combination is not feasible.

The first group of elements consisting of the relays and their ancillaries can be used alone, if necessary, to provide a simple form of automatic control.

The second group of elements improves the accuracy of the first group and in fact permits modification, according to the power demand, of the operating limits of the first group. This second group of elements can with advantage comprise time-delay devices to allow for the peculiarities of operation and stability in the running of vehicles or mechanisms driven by the gearbox.

The example hereinbefore described provides an image of the mechanical gearbox, using electrical relays. An identical analogy could however be obtained by means of mechanical, pneumatic or hydraulic relays. In the event of hydraulic relays being utilized, the tachometer generator could consist of a volumetric pump and the relays of calibrated ports closed by movable flaps.

It will of course be understood that other modifications may be made to the specific embodiment hereinbefore described, without departing from the scope of the invention.

It should be noted that the dispositions adopted ensure protection for the voltage relays by introducing successive resistors in the course of operation while at the same time regularizing the fidelity.

The compensating resistors referred to hereinabove provide compensations that operate on all the relays of a subsequent stage. If desired, such compensation could of course be provided on each relay in a given stage, which stage would then be the unique stage.

Alternatively, compensation could be dual and affect at once the relays of at least one stage and those of the subsequent stages.

What is claimed is:

1. In an automatic gearbox control device for regulating the drive of an output shaft, said device having a multiplicity of successive stages and in each stage a multiplicity of coupled gear trains constituting couplings of different multiplication ratios: a group of control relays divided into as many sets as there are stages in the gearbox, tachometer means associated with the output shaft of said gearbox and connected to the control relays to deliver variable voltage representing continuously varying variable-information to said relays for selectively energizing the same, each relay having a particular sensitivity and being adapted for being energized for a specific value of variable-information, the system of said relays having, with respect to said variable-information, sensitivities that are stepped substantially in accordance with the multiplication factors of said gear trains, and feedback means coupled to sets of relays of an end stage and of subsequent stages for acting on the groups of respectively subsequent relays, to affect the sensitivity of a set of relays at least upon the energization of at least one relay of a preceding stage.

2. A device according to claim 1, wherein each set of relays comprises a number of relays equal to one less than the number of gear ratios in the corresponding stage, which is provided with automatic return means to one of the ratios when none of the relays in the corresponding set has operated.

3. A device according to claim 1, wherein the tachometer means is a generator furnishing a voltage which varies continuously with the speed of rotation of the gearbox output shaft, each relay constituting a voltage relay which is energized for a predetermined value of said voltage.

4. A device according to claim 3, wherein all the relays have one of their poles connected to one of the generator terminals.

5. A device according to claim 1, wherein the relays of a set in a terminal stage of the gearbox are connected in parallel across the generator terminals.

6. A device according to claim 5, wherein the relays of a set in a terminal stage of the gearbox actuate armatures which are respectively adapted to introduce into the circuits supplying the relays of the other sets the resistance provided by a set of successive stepped resistors and also the resistance provided by a set of compensating resistors adapted to maintain the equivalent overall resistance of the circuits supplied by said generator constant irrespective of the switching effected.

7. A device according to claim 1, wherein the relays of each intermediate set include armatures which are adapted to introduce, into the circuits supplying the subsequent sets, successive stepped resistors and compensating resistors which are adapted to maintain the equivalent overall resistance of the circuits supplied by said generator constant irrespective of the switching effected.

8. A device according to claim 6, wherein the stepped resistors are disposed in series and are respectively connected across a contact clapper and a corresponding resting contact therefor in the corresponding armature, said resting contact being connected to the clapper of a subsequent relay.

9. A device according to claim 6, wherein each compensating resistor is connected across one of the generator terminals and an operative contact of a contacting clapper of the armature of one of said relays.

10. A device according to claim 1, wherein each relay armature comprises control means which operate to engage or select a corresponding train of meshing gears.

11. A device according to claim 1, wherein the complete set of relays is supplied by the tachometer means which is constituted by a generator driven by the gearbox output shaft, to provide successive relay energization levels which cause the gear ratios which are engaged to maintain the speed of the input shaft between two predetermined limit values despite variations in the speed of the output shaft and, upon deviation beyond the speed range defined by said limit values, to initiate a change of gear ratio.

12. A device according to claim 1, wherein the group of relays is associated with corrective devices which operate on the information variable to which the relays are sensitized.

13. A device according to claim 12, wherein said corrective devices are actuated according to the speed of the input shaft, and, according to the power delivered to the input shaft, one at a time or according to both at once.

14. A device according to claim 12, wherein said corrective devices comprise a resistor inserted into the relay supply circuit, said resistor being adapted to be shunted by a switch which is controlled by a tachometer device driven by a shaft coupled to the input shaft.

15. A device according to claim 12, wherein said corrective devices comprise a potentiometer inserted into the relay supply circuit, said potentiometer having a slider actuated by elements sensitive to the power developed on the drive shaft coupled to the input shaft.

16. A device according to claim 1, characterized wherein the number of relays is equal to the sum of the ratios provided by the several gearbox stages, less the number of stages, and effective to permit the selection of a ratio from a plurality of ratios the number of which is equal to the product of the number of ratios contained in the several stages.

References Cited by the Examiner

UNITED STATES PATENTS

| | | | |
|---|---|---|---|
| 2,182,438 | 12/39 | Kahn | 74—365 |
| 2,647,411 | 8/53 | Filocamo | 70—365 |
| 2,910,884 | 11/59 | Peras | 74—365 |
| 3,052,134 | 9/62 | Worster | 74—365 |

DON A. WAITE, *Primary Examiner.*